April 18, 1967  W. R. BAUER  3,315,053
PRESSURE RESPONSIVE RESETTING CONTROLLER
Filed April 16, 1964  4 Sheets-Sheet 2
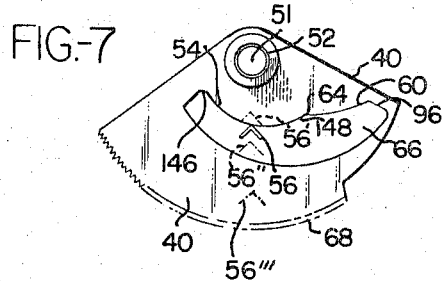
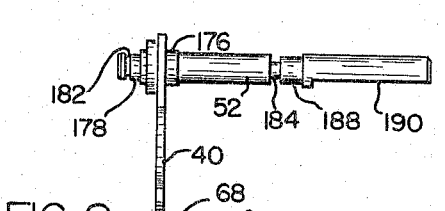
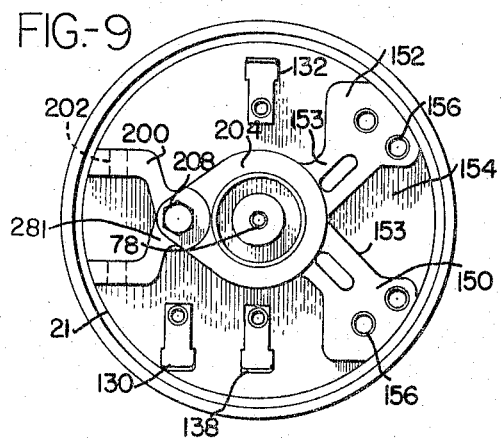
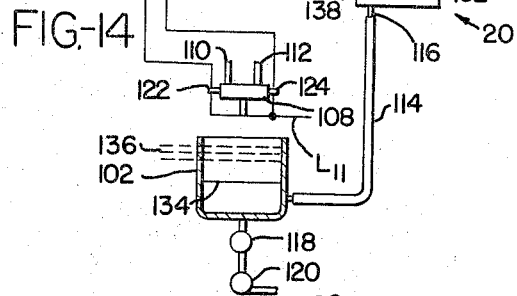
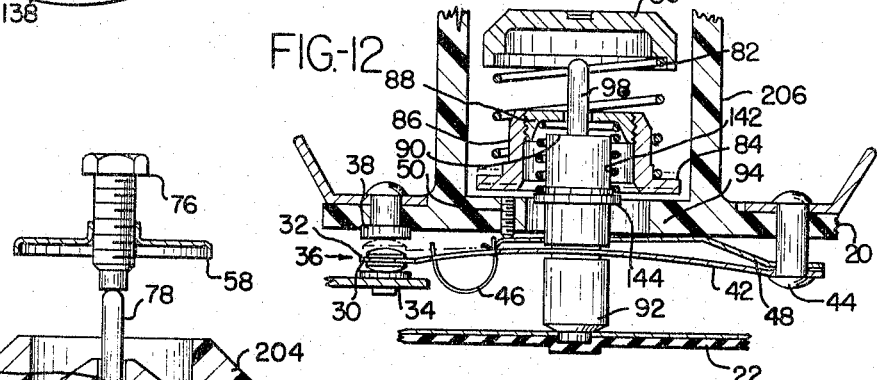
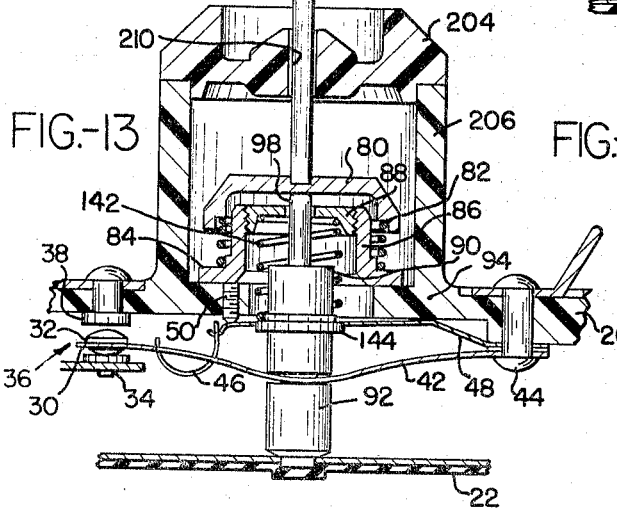
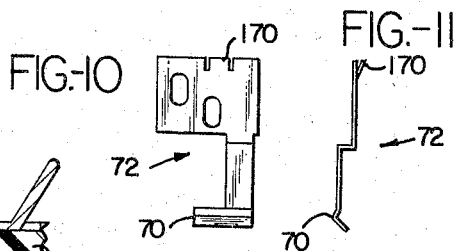
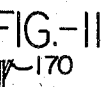
INVENTOR.
WERNER R. BAUER
BY
HIS ATTORNEYS

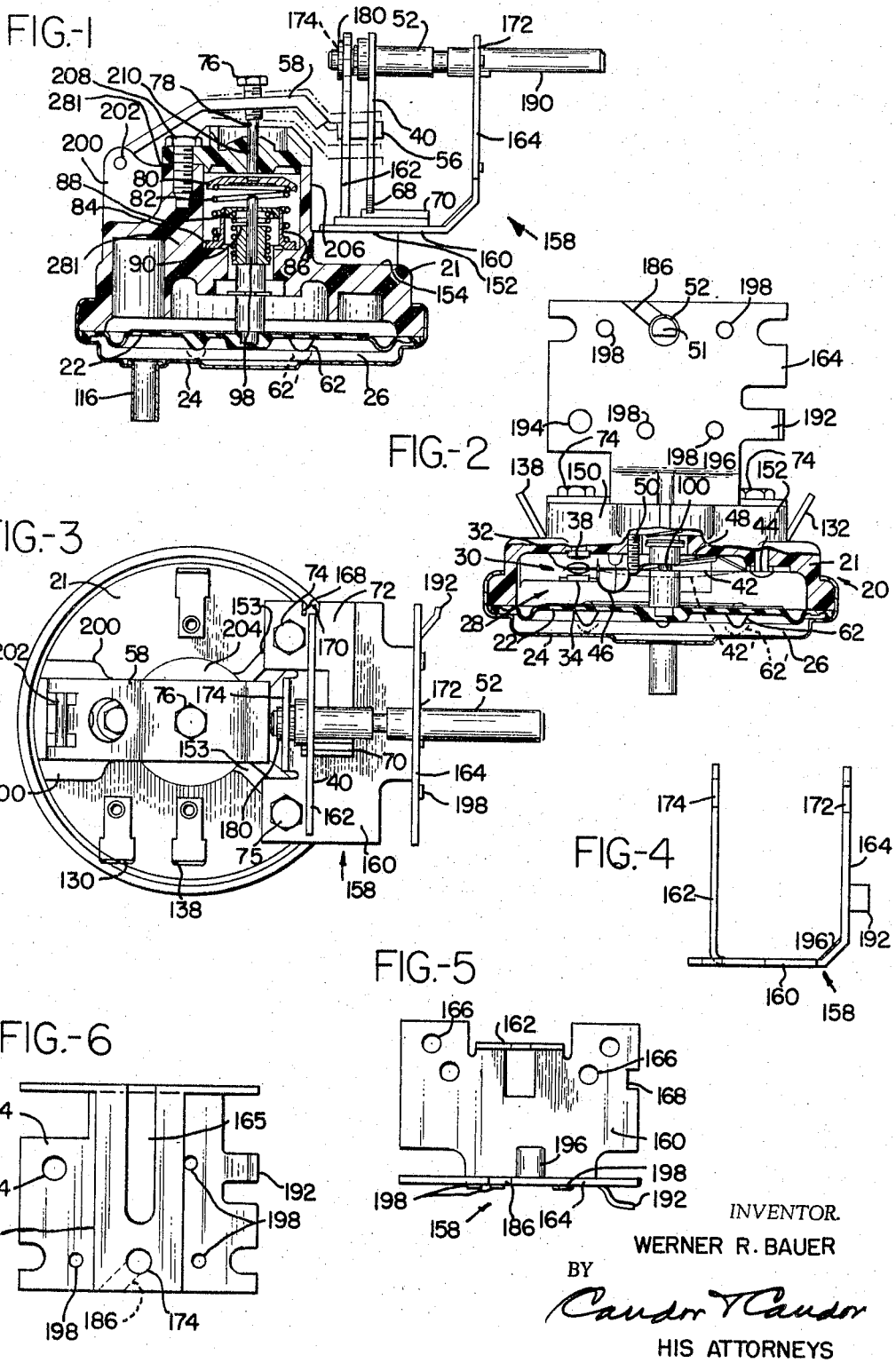

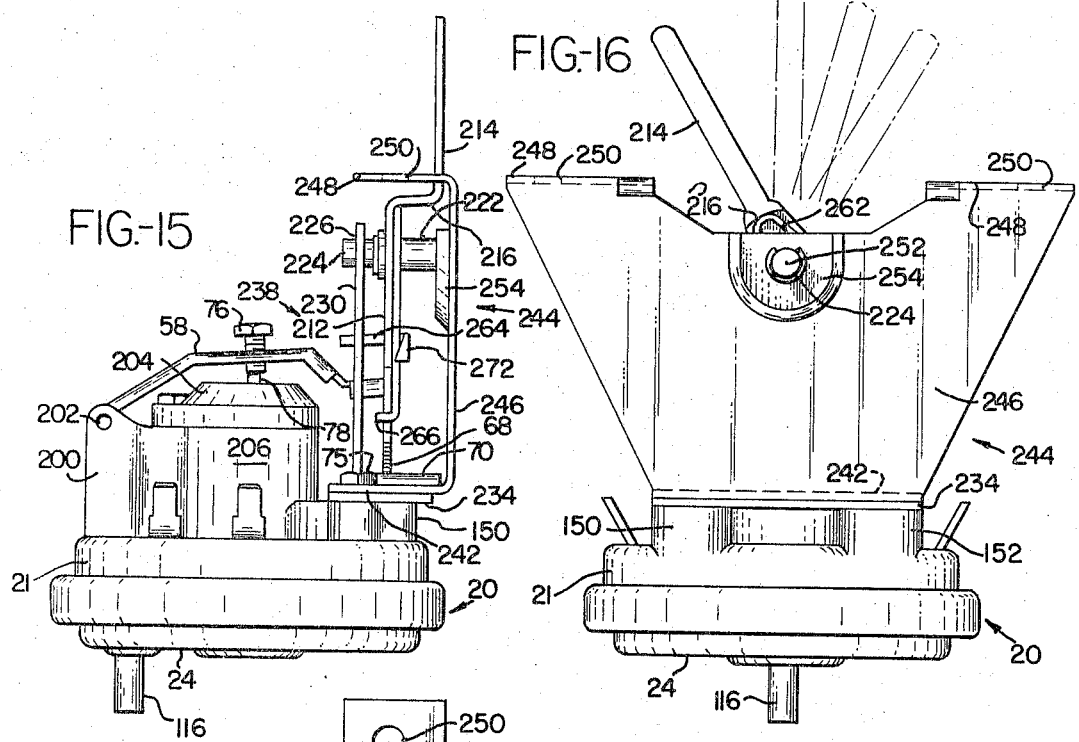
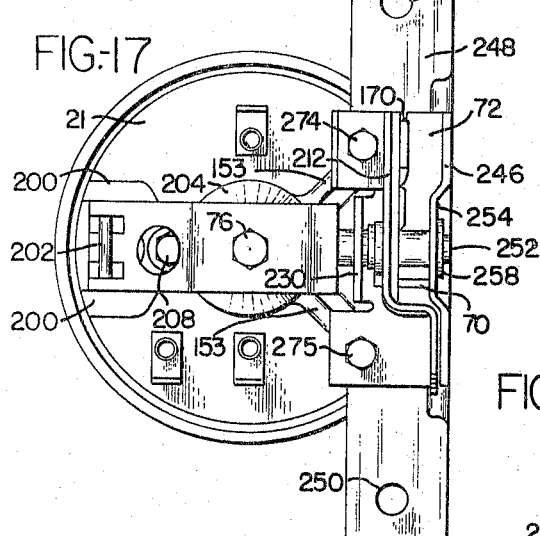
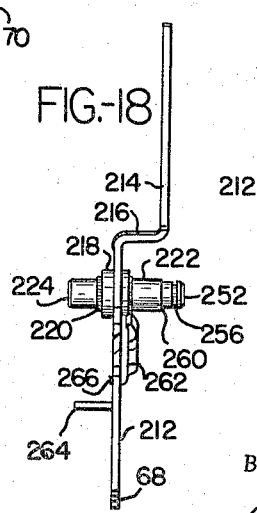
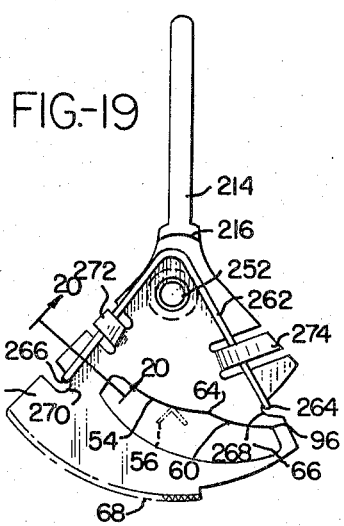
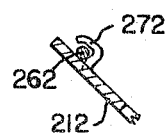

April 18, 1967 W. R. BAUER 3,315,053
PRESSURE RESPONSIVE RESETTING CONTROLLER
Filed April 16, 1964 4 Sheets-Sheet 4
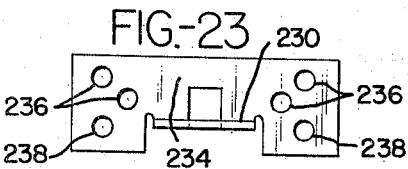
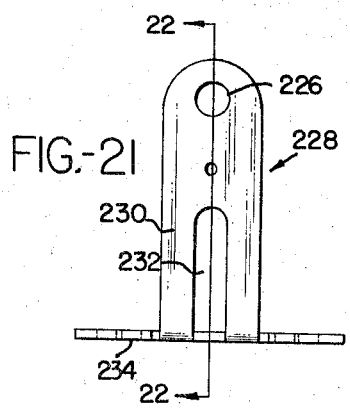
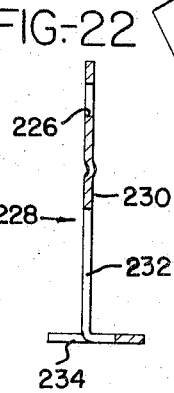
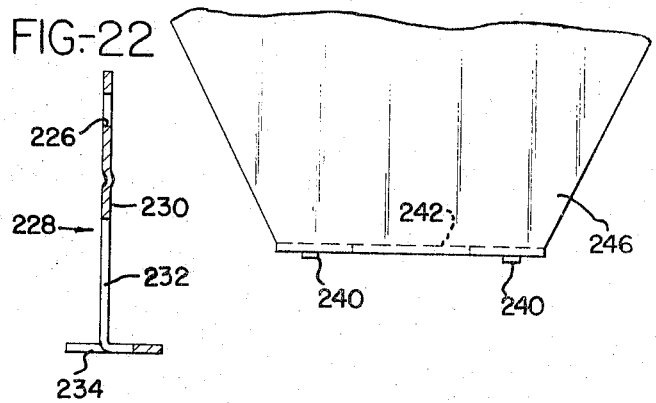
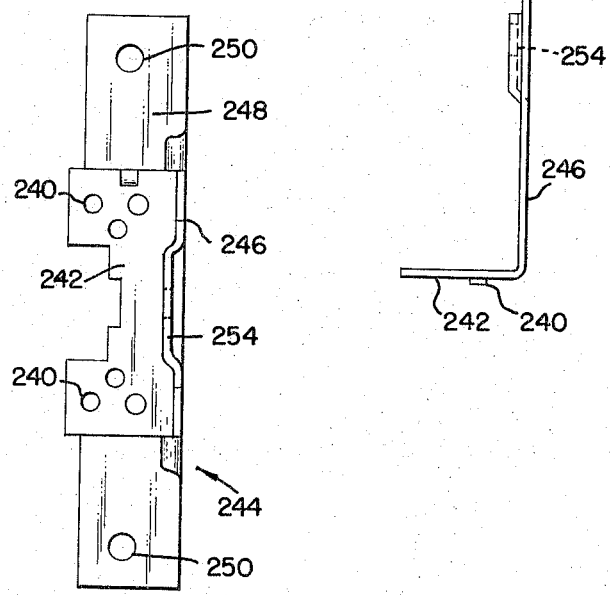
INVENTOR.
WERNER R. BAUER
BY
HIS ATTORNEYS United States Patent Office 3,315,053
Patented Apr. 18, 1967

3,315,053
PRESSURE RESPONSIVE RESETTING
CONTROLLER
Werner R. Bauer, Columbus, Ohio, assignor to Robertshaw Controls Company, Richmond, Va., a corporation of Delaware
Filed Apr. 16, 1964, Ser. No. 360,368
9 Claims. (Cl. 200—83)

This invention relates to a pressure responsive resetting controller.

A feature of this invention is directed to an improved support for the cam means of a pressure responsive controller.

Another feature of this invention is directed to a return spring construction built into the cam, which returns the cam from its reset position to its pressure responsive position.

Another feature of this invention includes a cam with a lever end receiving slot and an adjustment holding serrated edge which is engaged by spring means to hold the cam in adjusted position.

Another feature of this invention is directed to an improved snap action controller.

Other features are apparent from this description, the appended claimed subject matter and/or the accompanying drawings in which:

FIGURE 1 is a side view, partly in cross section, of an embodiment of this invention adapted to be adjusted by a knob or the like.

FIGURE 2 is a view from the right side of FIGURE 1.

FIGURE 3 is a plan view of FIGURE 1.

FIGURE 4 is a vertical cross section of one of the supporting bracket members.

FIGURE 5 is a top view of FIGURE 4.

FIGURE 6 is a side elevation of FIGURE 4.

FIGURE 7 is a front elevation of the adjusting cam, indicating various positions of the adjusting lever which may be obtained by adjustment of the cam.

FIGURE 8 is a side elevation of FIGURE 7, and showing also the actuated shaft for the cam.

FIGURE 9 is a plan view of the body of the switch construction without the adjusting lever, and supporting brackets and the cam construction.

FIGURE 10 is a plan view of the detent spring for maintaining the adjusting cam in its adjusted position.

FIGURE 11 is a side view of FIGURE 10.

FIGURE 12 is a view showing a portion of the switch construction shown in FIGURE 2 when the switch is ready to snap to a high pressure selected condition.

FIGURE 13 is a view similar to FIGURE 12, but showing the switch in the resetting condition.

FIGURE 14 is a diagrammatic view showing the connections between the structure of this invention and certain parts of a washing machine.

FIGURE 15 is a side view similar to FIGURE 1 and showing another embodiment.

FIGURE 16 is a side view of FIGURE 15.

FIGURE 17 is a plan view of FIGURE 15.

FIGURE 18 is a side view of the adjusting cam construction for the embodiment of FIGURE 15.

FIGURE 19 is a front view of FIGURE 18.

FIGURE 20 is a cross section along the line 20—20 of FIGURE 19.

FIGURE 21 is a front view of a bracket for the adjusting member.

FIGURE 22 is a vertical cross section of FIGURE 21.

FIGURE 23 is a plan view of FIGURE 21.

FIGURE 24 is a side elevation of a portion of one of the supporting brackets.

FIGURE 25 is a bottom view of the supporting bracket shown in FIGURE 24.

FIGURE 26 is a side elevation of the bracket shown in FIGURE 24.

According to this invention, a diaphragm holding casing or frame 20 may be provided which may enclose or hold a diaphragm 22 in or on said casing or frame 20. Means may be provided, such as lower wall 24 to form a variable fluid pressure responsive chamber 26 on one side of the diaphragm 22.

The upper casing structure 21 may be an integral molded plastic generally circular or externally cylindraceous construction.

A snap controller or switch 28 may be operatively connected to the diaphragm 22 to be snapped by the diaphragm between a set condition 30, as shown in FIGURE 2, with the movable contact 32 engaging the lower fixed contact 34. This may occur when the variable fluid pressure in the chamber 26 is at or near a generally low limit, at which time the diaphragm 22 is substantially at its lower limit of travel. When used with a washing machine this set condition 30 may occur when the tub 102, FIGURE 14, is empty, or nearly so.

The controller or switch 28 may be snapped from the set condition 30 of FIGURE 2 to an actuated condition 36, as shown in FIGURE 12, with the movable contact 32 engaging the upper fixed contact 38, when the variable fluid pressure in the variable fluid pressure chamber 26 is at any one of a plurality of selected upper pressure limits which can be established by an adjustment of cam means 40. When used with a washing machine, this actuated condition 36 may occur when the water level in tub 102, FIGURE 14, reaches any one of the selectable upper limit levels 136.

The snap switch 28 may be a snap switch or other snap controller of any well known type. For example, it may be a snap switch having a movable blade 42, which carries the movable contact 32 at one end, and is secured to a fixed fulcrum rivet 44 in the casing 20. The snap switch may also include a C-spring 46 which is fulcrumed at the left end of the adjustable fixed blade 48. The blade 48 may be adjusted by the turning of a screw 50 at the factory, which determines the pressures at which the blade 42 is snapped back and forth from the set position 30, to the actuated position 36, and vice versa.

The adjustable cam means 40 may be in the form of a disc or plate 40, as shown in FIGURES 1, 3, 7 and 8, which is oscillatably rotatable about the axis 51 of the shaft 52.

The cam means 40 may have a curved, upper pressure limit selecting, adjusting surface 54, FIGURE 7, which is eccentric to the axis 51 of the shaft 52, and is adjustable to cause the controller or switch 28 to be actuated to the actuated condition 36 of FIGURE 12 in response to any one of a plurality of differing upper pressure limits such as produced by upper water levels 136, FIGURE 14, which can be selected by the adjustment of the cam 40 and the surface 54 to move the end 56 of an adjusting lever 58. The adjusting lever 58, and its end 56, is adjustable by the surface 54 to any one of a plurality of differing upper pressure limit positions, such as positions 56′, 56 and 56″, which are indicated in FIGURE 7. The adjustment of the end 56 to any one of these upper limit selecting positions, causes the snap controller or switch to be actuated to the upper actuated condition of FIGURE 12 in response to any one of a plurality of selected upper pressure limits for the diaphragm 22, such as water levels 136, FIGURE 14, as is apparent from this description elsewhere.

The cam means 40 also has a resetting adjusting surface 60, FIGURE 7, which is connected to one end of the selecting adjusting surface 54. The surface 60 is movable into engagement with the end 56 of the lever 58 to cause the controller or switch 28 to be reset to the reset condition 30, as shown in FIGURE 2, even when the fluid pressure chamber 26 is at a pressure higher than the normal setting pressure of the diaphragm 22. This is accomplished when the surface 60, FIGURE 7, moves the end 56 of the lever 58 to the position 56''', when the extreme right end 96 of the curve 60 engages the end 56 of the lever 58 when the cam 40 is rotated to its extreme left position by actuation of the shaft 52. When this adjustment is made, the diaphragm 52 is moved to its extreme lowest position, when the diaphragm limit nubs 62, FIGURE 2, are moved to the dotted line position 62' into engagement with the lower part 24 of the casing 20. This causes the movable blade 42 to be moved to the dotted line position 42' which is shown in FIGURE 2. This insures that the switch it reset in condition 30 regardless of the pressure in chamber 26.

The selecting surface 54, FIGURE 7, may be a gradually curved surface as shown in FIGURE 7. Likewise, the surface 60 may be a gradually curved adjusting surface, and these two surfaces may have a common meeting point, which is indicated at 64 in FIGURE 7.

The surfaces 54 and 60, FIGURE 7, may form one edge of a curved slot 66 in which the end 56 of the lever 58 is positioned, and out of which the lever end 56 cannot move, after the apparatus is completely assembled.

The cam means 40 may also have an arc shaped serrated edge 68 which holds the cam 40 in its adjusted position. This is accomplished because the serrated edge 68 engages the bent end 70, FIGURES 1, 3, 10 and 11, of the holding spring 72 which is bolted down on the casing 20 by the screw bolt 74 in a manner to become more apparent elsewhere. The bent end 70 is held firmly against the serrations of the serrated edge 68 by the spring bias of spring 72 in a manner to hold the cam 40 in its adjusted position.

The adjusting lever 58 has a factory adjusted screw 76 which engages a pin 78, FIGURE 1, which in turn engages a disc or cup 80 which receives the upper end of the compression coil spring means 82. The lower end of the spring means 82 engages the flange 84 of the cup shaped member 86. The cup shaped member 86 has a factory adjustable screw threaded upper end member 88 which is engaged by the upper end 90, FIGURE 12, of a diaphragm and switch connecting member 92. When the diaphragm 22 has been moved to one of its upper selected pressure limits, and the diaphragm 22 has moved the member 92 upwardly, so that its end 90 engages the member 88, and lifts the cup shaped member 90 with its flange 84 lifted from the top wall 94 of the casing 20, as in FIGURE 12. Under these conditions, the spring means 82 has been adjusted by the lever 58 through the medium of screw 76, pin 78, disc 80 and member 92 to affect the responsiveness of the loading action of the spring 82 on the member 92 and diaphragm 22, so that the switch or controller 28 has been snapped to the actuated condition shown in FIGURE 12 from the set condition shown in FIGURE 2 at the particularly selected adjusted position of the surface 54, of FIGURE 7. This has caused the switch 28 to be moved to the actuated condition 36 at the particularly selected upper pressure limits, for the purpose, for example, of stopping the filling action of the tub of a washing machine at one of the selected upper levels 136, FIGURE 14, and for starting the washing operation by the closing of a circuit which is connected to the upper fixed contact 38. At the same time, the filling action, which is controlled by the lower fixed contact 34 is stopped, since the circuit is broken by the movement of the movable contact 32 away from the fixed contact 34.

Conversely, the switch or controller 28 may be snapped from the actuated condition shown in FIGURE 12 to the reset condition shown in FIGURE 13, by the adjustment of the cam means 40, by rotation clockwise in FIGURE 7, so that the extreme end 96 of surface 60 engages the end 56 of the lever 58 and pushes it down to position 56''' to produce the positions shown in FIGURE 13. At that time, the disc 80 has been pushed down by the lever 58, so that it has engaged the pin extension 98 of the contacting member 92 and has pushed the member 92, and the diaphragm 22 to the extreme lowest position, with the nubs 62 of the diaphragm engaging the lower part 24 of the casing 20, as shown in dotted lines 62' in FIGURE 2. This positively moves the switch blade 42 to its lowest position 42' and snaps the contact 32 against the lower fixed contact 34, even if the pressure in chamber 26 is at a high pressure condition. This occurs even when the pressure in chamber 26 is above any normal setting pressure which would cause the switch to be set normally by the downward movement of the water level during the emptying of the tub of a washing machine.

The contacting member 92 has a groove 100 which is engaged by an opening in the blade 42, so that movement of the diaphragm 22 is transmitted to the blade 42. During normal filling of the washing machine, when the tub is empty, the diaphragm 22 and the switch 28 are in the position show in FIGURE 2 with the contact 32 against the stationary contact 34.

FIGURE 14 shows a diagrammatic connection between the structure 20 of this invention, and certain parts of a washing machine of the automatic type. Washing machine has a tub 102 and a timer 104. The timer 104 is driven by timer motor 106. The automatic water valve is shown at 108 and is fed by hot and cold water pipes 110 and 112 under control of the usual solenoids and discharges into the tub 102. The bottom of tub 102 is connected by pipe 114 to the connector 116 of the casing 20. A drain valve 118 and a drain pump 120 may be controlled by the timer 104 which may also control the hot and cold water solenoids 122 and 124 and any other washing machine members 126 and 128 which are to be controlled by the timer 104. The electrical connector 130 may be selectively connected to the water control solenoids 122 and 124 under the control of the timer 104. The connector 130 is connected in the control system to the lower stationary contact 34. Hence, the tub 102 is filled by either hot or cold water, as determined by the timer 104 by current flowing from line $L^1$ to connector 132, which is connected to the fulcrum rivet 44 and the blade 42, so that current can flow to either or both of the solenoids 122 and 124 as long as the movable contact 32 engages the stationary contact 34. The water level 134 rises in the tub 102 until it reaches any one of the selected positions of the upper water level limits 136. The fluid pressure in the connector pipe 114 and chamber 26, then rises to produce the condition shown in FIGURE 12, where the blade 42 is snapped up, so the movable contact 30 engages the upper fixed contact 36. This deenergizes the electrical connector 130, and energizes the electrical connector 138. This stops the filling action of the tub 102, and causes the time 104 to operate the various other parts of the washing machine, such as parts 126 and 128, and also causes the motor 106 to drive the timer.

If desired, a bypass line $L^1$, under control of the timer 104, may feed the timer 104 at 140 when it is desired for the timer to operate independently of the water level controller 20.

After a washing operation in the washing machine, the time 104 may open the drain valve 118, and actuate the drain pump 120, so that the water level in the tub 102 starts to fall. With the falling pressure of the water in the tub 102, a corresponding fall in the pressure of the chamber 26 is produced, with a downward motion of the diaphragm 22. This is a gradual downward movement of the diaphragm 22, which gradually lowers the connecting member 92, so that the cup shaped member 86 is also lowered until the flanges 84 rest on the upper wall 94. When this happens, the spring means 82 no longer controls the action of the diaphragm 22. Instead, another spring means 142 which creates a compression action between the top member 88 and a flange 144 on the member 92 assumes control of the diaphragm 22. This spring 142, which is of lesser strength than the spring 82, then controls the downward movement of the diaphragm 22 in response to pressures in the chamber 26. As the pressures in chamber 26 become lower by emptying of the water, a condition will arise, which is the normal resetting action of the apparatus, at which time, the movable contact 30 is snapped from the upper contact 36 to the lower contact 34. However, this may occur at the water level position 134, before the water level reaches the completely empty condition, and this level is determined by the value of the spring 142. The timer 104 controls whether the tub 102 will continue to be emptied by the valve 118 and/or the pump 120, or whether the tub is to be refilled for a rinse action or the like. This is entirely determined by the cam actions within the timer 104, as desired by the manufacturer of the washing machine.

The washing machine may be refilled by the water valve 108, as long as the contact 32 is against the lower stationary contact 34 after it has been reset by the normal action of the spring 142. However, occasionally the user of the washing machine sets the selecting cam 40 at some lower level selected position, such as when the cam 40 is adjusted counterclockwise so that some point 146 engages the end of the lever 56. The tub 102 is allowed to be filled to one of the lower upper limit positions, such as is established by the lever at position 56″. When the tub is filled to this level, the snap switch 28 snaps up to the selected upper level determined by the position 56″ and the filling action of the washing machine is stopped by the movement of the blade 42 to its actuated condition 36. If, at that time, the user decides that more water is desired in the tub, the user might adjust the cam 40 clockwise, so that the point 148 of curve 44, FIGURE 7, is brought opposite the end 56 of the lever 58. This will adjust the end to the position 56′ from the position 56″. However, since the switch contact 32 is now in the actuated condition, with movable contact 32 up against the stationary contact 38, no further filling action will be produced. Hence the tub will remain at the original selected lower level position. With the resetting surface 60 on cam 40, however, the user may first move the cam 40 clockwise until the resetting point 96 is brought against the end 56 of the lever 58 and under such conditions, the end of the lever will be pushed down to the position 56‴ and will reset the switch by moving the contact 32 against the lower contact 34 regardless of the fact that the pressure in chamber 26 will be a high pressure as was established by the original setting. When the cam 40 is so adjusted that point 96 engages the end of the lever 56, the action shown in FIGURE 13 takes place where the disc 80 is pushed down by the lever 58 against the pin extension 98 of the connecting member 92. This pushes the member 92 down to its lowest extreme low position as indicated at 62′ in FIGURE 2 and as shown in FIGURE 13, so that the movable contact 32 is pushed down against the lower stationary contact 34. This resets the switch 28 to the set condition, and then the cam 40 may be adjusted by the user so that the point 148 is engaging the end 56 of the lever 58, and this causes a filling action until the tub of the washing machine 102 is filled to the new selected upper limit position 136, at which time the switch 28 will be snapped to the new actuated position corresponding to the newly chosen upper limit level.

The upper body of the casing 20, which is shown in plan view in FIGURE 9, has a pair of integral platforms 150 and 152 which are elevated above the main floor 154 of the upper part of the casing. The platforms 150 and 152 are integrally united with the body 21 and with the tubular extension 206 by reinforcing ribs 153. The platforms 150 and 152 have threaded openings 156 to receive screw bolts, such as 74 and 75, FIGURE 3, with which to attach certain brackets to be described, and the holding spring member 72.

The shaft supporting bracket 158 is shown in top plan view in FIGURES 3 and 5 and in side view in FIGURES 1, 2, 4 and 6.

The bracket 158 is U-shaped, as seen in FIGURES 1 and 4. It has a flat base 160 and two vertical sides 162 and 164. The base has a plurality of openings 166 through which any desired number of screw bolts 74 and 75, etc., may pass into the holes 156 of the base 20. As illustrated, only two bolts 74 and 75 are used, but more may be used, if desired. A notch 168 is provided to receive the tongue 170 of the spring member 72 to lock the spring member against rotation of the bolt 74.

Openings 172 and 174 are provided in the side members 164 and 162 to receive the shaft 52. The shaft 52 has a knurled portion 176, FIGURE 8, to receive the cam 40, which can be pressed on the shaft. It also has a smooth extension 178 to enter into the opening 174, after which the shaft can be fastened by an inwardly pronged split ring 180 which is placed in the groove 182. A deep groove 184 may be used to insert the shaft through the slot 186, FIGURE 2, in the side 164 and thereafter the smooth portion 188 has been axially pushed into the opening 172. Then the split ring 180 is placed in the groove 182 to lock the shaft in position. The shaft 52 has a flat portion 190, FIGURE 8, to receive a knob and prevent relative rotation between the knob and the shaft 52.

The tongue 192, FIGURES 2 and 3, may be used to engage the cabinet edge to which the bracket is attached and a screw bolt may be placed in the opening 194 for attaching the bracket to the cabinet. A strengthening rib 196 may be struck in the bracket, where the side 164 engages the base 160. Half or partial punches 198 may form protrusions in the side 164, to engage the side of the cabinet and prevent sliding motion.

The body 21 has a pair of integral shoulders 200 across which the pin 202 extends and provides a fulcrum for the lever 58.

A cap 204 is placed over the integral tube like extension 206 of the casing 20 and is secured thereto by means of the screw bolt 208 which extends into the uniting structure 201 which joins the shoulders 200 and the tubular extension 206. The pin extension 78 passes through an opening in the cap 204, as shown. The space between the pin 78 and the opening 210 is sufficiently close, so that an air snubbing action is produced in the flow of air through said opening, so that the diaphragm 22 cannot be bounced upwardly by water surges in the tub 102.

In the operation of the embodiment of FIGURES 1 through 14, it is assumed that the tub 102 of FIGURE 14 is empty and that the user desires to start a washing operation. The user will adjust the knob, not shown, of the timer 104, to select the particular program which is desired to be used. The user also selects the position of water level selecting surve 54 of cam 40. The user then actuates the starting device on the timer, which will cause the timer to put the water solenoids 122 and 124 in a circuit with the electric connectors 130 and 132, FIGURE 14. At this time, the movable contact 32 is engaging the lower stationary contact 34, since the tub 102 is empty. Water is then introduced into the tub 102. The tub is then filled to one of the selected upper limit levels 136, which correspond to the selected position on the curve 54 of the cam 40. At that time the diaphragm 22 has been raised by the pressure of the water in the tub 102 until the movable blade 42 snaps the contact 32 upward as show in FIGURE 12. This stops the filling action, and breaks the circuit of the solenoids 122 and 124, and energizes the electric connector 138 to start operation of the timer 104, and to produce the desired energization of members 126, 128, etc., which will perform a washing operation and any other operations that the time is capable of controlling.

Assume that the user has first adjusted the cam 40 for a shallow fill of the tub, as by moving the point 146, FIGURE 7, of the cam 40 into engagement with the lever 56. The user allows the tub 102 to be filled to the shallow upper level of the various levels 136, so that the switch is snapped to the actuated position of FIGURE 12 when the shallow fill of the tub is reached. He may then reset the switch by rotating the cam 40 clockwise until the point 96, FIGURE 7, engages the lever end 56, which adjusts such lever end 56 down to the position 56''' and resets the switch to the position shown in FIGURE 13, with the movable contact 32 engaging the lower stationary contact 34.

Thereafter, the user adjusts the cam 40 to a new higher level position, such as with position 148 of FIGURE 7 in contact with the end 56 of the lever. The water filling action can then take place, since the movable contact 32 has been reset against lower contact 34, and the water valve solenoids 122 and 124 can be energized through the circuit, which includes the electric connector 130. The tub is then filled to provide a deeper water level 136, and when it reaches the new selected deeper water level, the switch is snapped upwardly to the actuated position of FIGURE 12, as previously described, when the member 92 lifts the cup member 86 and snaps the movable contact 32 upward. This changes the circuits to the timer 104, so the timer 104 can proceed to cause the washing machine to produce the desired washing actions with connector 138 in the circuit.

In the embodiment of FIGURES 15+, all of the members in or out of the casing 20, except the bracket and cam constructions, may be substantially the same as in FIGURES 1-14, including the lever 58. The switch action within the casing 20 is the same as previously described in connection with FIGURES 1-14, and hence illustration and description thereof is omitted as much as possible, since the previous illustrations and descriptions are applicable. The principal differences between FIGURES 15+ and the previous FIGURES 1-14 are that the cam and bracket constructions on FIGURES 15+ are somewhat different than those of previous constructions.

The cam 212 of FIGURES 18 and 19 has the same general shape as the cam 40 of FIGURES 7 and 8 insofar as the surfaces 54 and 60, the slot 66, and the serrated edge 68 are concerned. Hence, the same reference numerals are used for these members, and no further description is repeated, since the description previously given applies to these members.

Also, the serrated surface 68 is substantially the same as previously described in connection with cam 40. The serrated surface 68 cooperates with a detent spring 72, and its bent portion 70 substantially identical with the spring member illustrated in FIGURES 10 and 11 and operates as previously described, and hence its operation and construction are not again described.

However, the cam 212 has an integral handle 214 which is connected to the cam 212 by an integral bent portion 216. The cam 212 has a sleeve 218 which is drawn from, or welded to, the cam 212. The sleeve 218 is press fitted over the knurled portion 220 of the shaft 222.

The shaft 222 has an end 224 which is inserted in an opening 226 in bracket member 228 which is shown in FIGURES 15, 21, 22 and 23. The bracket member 228 has a vertical wall 230 with a slot 232, which corresponds to the slot 165 of FIGURE 6. These slots 165 and 232 receive the free end 56 of the lever 58 and prevent any sidewise movement of the lever 58 when it is engaged by the moving cams 40 or 212. The member 228 also has a base 234 which is provided with openings 236, FIGURE 23, which may receive two or more screw bolts 74 and 75, which are substantially the same as the previously described screw bolts 74 and 75 of FIGURE 3.

In addition, the base 234 has a pair of holes 238 which are adapted to receive a pair of half punches 240 in the base member 242 of the bracket 244.

The bracket 244, which is shown in FIGURES 15-17 and 24-26, has a vertical wall 246 which has a horizontal upper flange 248 with openings 250 for attachment under the top of a cabinet or the like, which cabinet top may have a slot through which the handle 214 may extend upwardly. The flange 248 may be attached to the under side of such top or the like.

The end 252 of shaft 222 extends through an opening in the countersunk portion 254 of wall 246. The end 252 of the shaft has a groove 256, FIGURE 18, to receive the split ring 258, FIGURE 17, for locking the shaft 222 in the shaft opening in the countersunk portion 254. The shoulder 260 of the shaft 222 and the split ring 258 hold the shaft 222 against longitudinal movement in such shaft opening.

The brackets 228 and 244 may be assembled on the body 20 of the water level switch, which is shown in plan view in FIGURE 9. The base 234 is first placed on the platforms 150, 152 of FIGURES 9, 15 and 16. Thereafter the base 242 and the spring member 72 (shown in FIGURES 10 and 11) are then assembled above the base 234 and are secured together by means of the bolts 74 and 75. The shaft 222 and the cam 212 are assembled at any time while the members are in a loose condition and before they are finally tightened by the bolts 74 and 75. In this manner the cam 212 is assembled to engage the end 56 of the lever 58 in the same manner as is done by the cam 40.

If desired, the cam 212 may be provided with spring means for positively moving the cam 212 away from the resetting position, after the cam 212 has been moved to its resetting position, with the point 96 engaging the lever end 56. This is accomplished by providing a spring wire member 262, FIGURES 18-20, which has ends 264 and 266 which extend into notches 268 and 270. The ends 264 and 266 are spring biased toward each other, and the end 264 extends out sufficiently far to engage the edge of the vertical bracket wall 230 when the cam 212 is moved to the reset position, see FIGURE 15. The inward bias of the spring end 264 toward the spring end 266 causes the spring to pull the cam 212 counterclockwise, as viewed in FIGURE 19. The spring end 264 engages the vertical wall 230 at the time that the part 96 of the curve 60 engages the lever end 56. Hence, the bias will pull the cam 212 counterclockwise to the point 64 where the curves 54 and 60 meet, and which will produce the highest level of fill, unless the user deliberately moves the lever 214, so as to place other parts of the curve 54 against the lever end 56.

A tongue 272 firmly holds one leg of the spring 262 against relative movement, and another tongue 274 slidingly holds the other leg of the spring 262, so that it can slide rightwardly, in FIGURE 19, when the cam 212 is moved clockwise in FIGURE 19 to bring the point 96 against the lever end 56. When the handle 216 is released, the spring end 264, acting against the side of bracket wall 230, will return the cam 212 to the point 64, where it will remain with the point 64 engaging the lever end 56. The user may further move the cam 212 counterclockwise by the handle 214, to provide lower "fill" levels of the water in the tub of the washing machine, if desired.

The operation of the embodiment of FIGURES 15+ is substantially the same as previously described in connection with the FIGURES 1-14, except for the cam and bracket actions just described, and it is believed unnecessary to repeat the description of the operation thereof other than to say that the handle 214 is used to operate the cam 212 and a knob or the like is used to operate the cam 40. The cam 40 may be provided with spring means, such as disclosed in connection with the cam 212, if desired. However, if there is enough resiliency in the upward bias of the lever 58, the spring 262 may be omitted in either embodiment.

Certain words indicating direction and/or relative position are used herein for the sake of clearness and brevity. However, it is to be understood that such words apply only to the direction or relative position shown in the drawings, and that the actual apparatus may have entirely different relative positions and directions. Examples of these words are "upper," "lower," "vertical," "horizontal," etc.

In the claimed subject matter, the words "integral" and the like are intended to means a one-piece member or members as set forth in such claimed subject matter, as the context indicates.

It is thus to be seen that a new, useful and unobvious control has been provided by this invention.

While the form of the invention now preferred has been disclosed as required by statute, other forms may be used, all coming within the scope of the claimed subject matter which follows.

What is claimed is:

1. In combination: a diaphragm; means forming a variable fluid pressure responsive chamber on one side of said diaphragm; fluid flow means connected with said variable fluid pressure responsive chamber and connectable with a variable fluid pressure producing means; a controller; connecting means connecting said diaphragm and said controller to cause said controller to be changed to a set condition, when said variable fluid pressure on one side of said diaphragm is substantially at a generally low limit, and an actuated condition when said variable fluid pressure on one side of said diaphragm is at any one of a plurality of selected upper pressure limits; an adjusting cam member rotatable about an axis and having a curved upper pressure limit selecting adjustable surface eccentric to said axis adjustable by rotation of said cam member, surface operated means operated by said adjusting surface to cause said connecting means to cause said controller to be actuated to said actuated condition in response to said any one of a plurality of selected upper pressure limits, said cam member having a resetting adjusting surface conncted to one end of said selecting adjusting surface movable to cause said surface operated means to cause said connecting means to cause said controller to be reset to said set condition while said fluid pressure chamber is at a higher pressure than said generally low limit said cam member including holding means, and a holding spring engaging said holding means to hold said cam members in adjusted position, and in which said selecting adjusting surface and said resetting adjusting surface form one edge of a curved closed slot in said adjusting cam member.

2. A combination according to claim 1 in which said holding means includes an arc-shaped serrated edge on said cam member, and said holding spring engages said serrated edge to hold said cam member in adjusted position.

3. In combination: a diaphragm; means forming a variable fluid pressure responsive chamber on one side of said diaphragm; fluid flow means connected with said variable fluid pressure responsive chamber and connectable with a variable fluid pressure producing means; a controller; connecting means connecting said diaphragm and said controller to cause said controller to be changed to a set condition, when said variable fluid pressure on one side of said diaphragm is substantially at a generally low limit, and an actuated condition when said variable fluid pressure on one side of said diaphragm is at any one of a plurality of selected upper pressure limits; an adjusting cam member rotatable about an axis and having a curved upper pressure limit selecting adjustable surface eccentric to said axis adjustable by rotation of said cam member, surface operated means operated by said adjusting surface to cause said connecting means to cause said controller to be actuated to said actuated condition in response to said any one of a plurality of selected upper pressure limits, said cam member having a resetting adjusting surface connected to one end of said selecting adjusting surface movable to cause said surface operated means to cause said connecting means to cause said controller to be reset to said set condition while said fluid pressure chamber is at a higher pressure than said generally low limit, said cam member including holding means, and a holding spring engaging said holding means to hold said cam members in adjusting position, and having a shaft carrying said cam member in which said cam member is a generally flat cam member mounted on said shaft, said shaft being mounted on bracket means having two spaced vertical walls with said cam member between said vertical walls, one of said walls having a vertical slot adjacent said cam member, and a lever connected to said controller with an end extending in said slot and actuated by said cam member, and in which said flat cam member has a curved slot one edge of which forms said adjusting surfaces, said holding means including a serrated edge on said cam member below said slot, and said holding spring being between said vertical walls and engaging said serrated edge to hold said cam in adjusted position.

4. In combination: a diaphragm holding casing having a top bracket supporting surface; a diaphragm in said casing forming a variable fluid pressure responsive chamber on one side of said diaphragm; a switch in said casing; actuating means in said casing connected to said diaphragm and said switch and having an actuating rod extending through said bracket supporting surface; a lever fulcrumed on said supporting surface engaging said actuating rod and having a free adjustable lever end; bracket means mounted on said bracket supporting surface and having two spaced vertical walls with one of said walls having a bracket slot through which lever end extends; a horizontal shaft supported on said walls; a generally flat cam adjustably and oscillatably mounted on said shaft between said walls and having a switch adjusting slot into which said lever end extends and having a lower serrated cam edge; and adjustment holding spring means supported by said supporting surface and engaging said serrated cam edge and holding said cam in adjusted position.

5. A combination according to claim 4 in which said spaced vertical walls are integral with a horizontal base which is mounted on said bracket supporting surface.

6. A combination according to claim 5 in which said adjustment holding spring means is mounted on said horizontal base.

7. A combination according to claim 4 in which said vertical walls are respectively integrally mounted on separate horizontal bases, said bases being mounted on said bracket supporting surface.

8. A combination according to claim 7 in which said adjustment holding spring means is mounted on one of said horizontal bases.

9. A combination according to claim 4 in which said slot has a curved upper pressure limit selecting adjusting surface eccentric to said shaft to cause said switch to be actuated to actuated condition, and has a resetting adjusting surface at one end of said selecting adjusting surface movable to cause said switch to be reset to reset condition.

References Cited by the Examiner

UNITED STATES PATENTS

| | | | |
|---|---|---|---|
| 2,274,312 | 2/1942 | Werner | 200—83 |
| 2,636,093 | 4/1953 | Clark et al. | 200—83 |
| 2,850,598 | 9/1958 | Rauh | 200—140 |
| 2,921,158 | 1/1960 | Taylor | 200—83 |
| 3,088,485 | 5/1963 | Hanssen | 74—568 X |
| 3,230,328 | 1/1966 | Chapin | 200—83 |

BERNARD A. GILHEANY, *Primary Examiner.*

H. GILSON, H. M. FLECK, G. MAIER,
*Assistant Examiners.*